United States Patent
Wang

(10) Patent No.: US 10,209,544 B2
(45) Date of Patent: Feb. 19, 2019

(54) FLEXIBLE SUBSTRATE AND MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Junwei Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 224 days.

(21) Appl. No.: 15/035,942

(22) PCT Filed: Oct. 14, 2015

(86) PCT No.: PCT/CN2015/091897
§ 371 (c)(1),
(2) Date: May 11, 2016

(87) PCT Pub. No.: WO2016/201830
PCT Pub. Date: Dec. 22, 2016

(65) Prior Publication Data
US 2017/0192286 A1    Jul. 6, 2017

(30) Foreign Application Priority Data

Jun. 15, 2015 (CN) .......................... 2015 1 0330778

(51) Int. Cl.
*G02F 1/153* (2006.01)
*G02F 1/1333* (2006.01)

(52) U.S. Cl.
CPC .... *G02F 1/133305* (2013.01); *G02F 1/13338* (2013.01); *G02F 2001/133354* (2013.01)

(58) Field of Classification Search
CPC ............. G02F 1/1533; G02F 1/133305; G02F 2001/133354
USPC ................................................ 430/254, 253
See application file for complete search history.

(56) References Cited

U.S. PATENT DOCUMENTS

| | | | |
|---|---|---|---|
| 2006/0240275 A1 | 10/2006 | Gadkaree | |
| 2007/0111391 A1 | 5/2007 | Aoki et al. | |
| 2008/0096022 A1* | 4/2008 | Naito ................... | H05K 9/0096 428/409 |
| 2010/0264112 A1 | 10/2010 | Jiang et al. | |
| 2011/0311276 A1* | 12/2011 | Yonehara ................... | B41J 2/45 399/220 |
| 2015/0332885 A1 | 11/2015 | Su et al. | |

FOREIGN PATENT DOCUMENTS

| | | |
|---|---|---|
| CN | 101877319 A | 11/2010 |
| CN | 102915965 A | 2/2013 |
| CN | 102956668 A | 3/2013 |
| CN | 103345084 A | 10/2013 |
| CN | 103715364 A | 4/2014 |
| CN | 103985665 A | 8/2014 |
| CN | 104465479 A | 3/2015 |
| CN | 104880846 A | 9/2015 |

OTHER PUBLICATIONS

Office Action from corresponding Chinese Application No. 201510330778.3, dated May 15, 2017 (9 pages).

* cited by examiner

*Primary Examiner* — Daborah Chacko-Davis
(74) *Attorney, Agent, or Firm* — Harness, Dickey & Pierce, P.L.C.

(57) ABSTRACT

The present invention discloses a flexible substrate and a manufacturing method thereof, and a display device, comprising: disposing a detachable layer on a rigid substrate, and fixing the flexible base on the rigid substrate by the detachable layer, wherein the detachable layer comprises a mesh layer and a plurality of mutually independent supporting parts disposed in meshes of the mesh layer; forming a functional layer on the flexible base to obtain a flexible substrate; separating the flexible substrate from the rigid substrate by applying an external force on the mesh layer. The present invention makes it easier for the flexible substrate to be stripped off after it is manufactured, improves the yield rate; moreover, the present invention has the process compatibility of ordinary production lines, and saves costs.

10 Claims, 3 Drawing Sheets

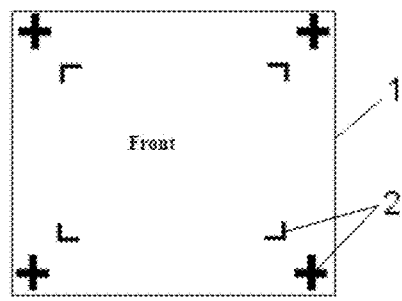
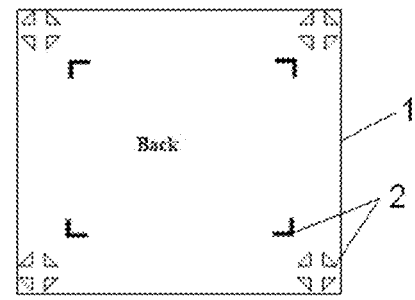
Fig. 3a      Fig. 3b
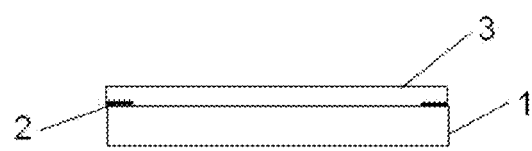
Fig. 3c
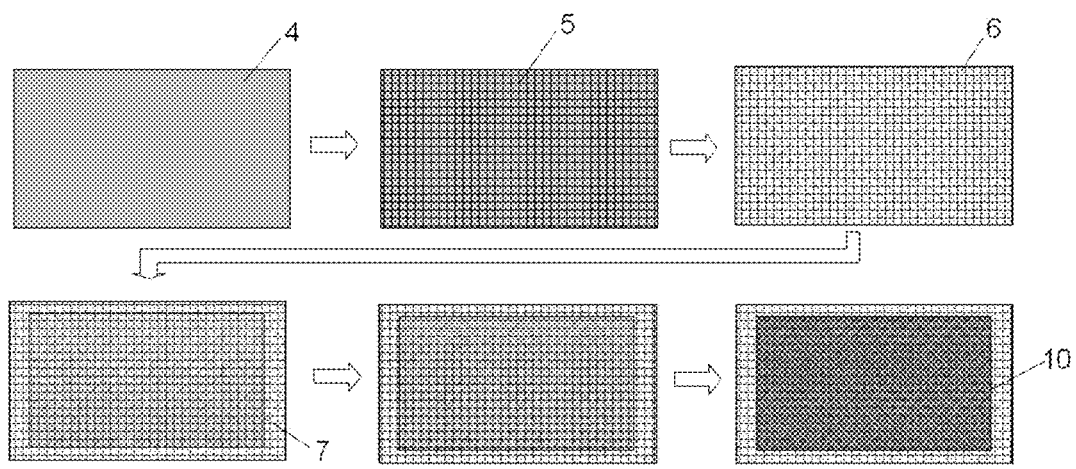
Fig. 4a

FLEXIBLE SUBSTRATE AND MANUFACTURING METHOD THEREOF AND DISPLAY DEVICE

TECHNICAL FIELD

Embodiments of the present invention relate to a flexible substrate and a manufacturing method thereof, and a display device including the flexible substrate.

BACKGROUND OF THE INVENTION

With the rapid development of display technologies, display products are becoming more and more diversified and humanized, and flexible displays represent an important development direction.

The currently existing manufacturing method of a flexible substrate based on a glass substrate directly adheres a flexible substrate on a glass substrate, and when it needs to be stripped off, the adhesive glue is degenerated by an UV decomposition method or a heat softening method, so that it is stripped off. The process of directly adhering the flexible substrate on the glass substrate has many problems. For example, the UV decomposition method will cause irreversible damage to the liquid crystals, and is not suitable for the One Drop Fill (ODF) process, so the problem of liquid crystal dripping in vacuum needs to be solved again. The heat-softening method needs to consider the material of the flexible substrate and the temperature of the technical process, and the effect is not ideal. In addition, the process of directly adhering the flexible substrate on the glass substrate also has the defects of insufficient adhesion strength, being unable to produce large-scaled substrates, easily damaging the flexible substrate during the stripping off process, etc.

SUMMARY OF THE INVENTION

The objective of the present invention is to provide a flexible substrate and a manufacturing method thereof, and a display device, in order to make the flexible substrate be easily stripped off after it is manufactured, and improve the yield rate.

In order to solve the above technical problem, in a first aspect of the present invention, there is provided a manufacturing method of a flexible substrate, comprising:

S1: disposing a detachable layer on a rigid substrate, and fixing a flexible base on the rigid substrate by the detachable layer, wherein the detachable layer comprises a mesh layer and a plurality of mutually independent supporting parts disposed in meshes of the mesh layer;

S2: forming a functional layer on the flexible base to obtain a flexible substrate;

S3: separating the flexible substrate from the rigid substrate by applying an external force on the mesh layer.

Preferably, step S1 comprises:

S11: forming a first photoresist layer with a mesh layer on the rigid substrate;

S12: exposing and developing the first photoresist layer to form a plurality of supporting parts, the supporting parts being in the meshes of the mesh layer;

S13: adhering the flexible base and the plurality of supporting parts;

step S3 comprises:

S31: cutting the rigid substrate to expose edges of the mesh layer;

S32: separating the flexible substrate from the rigid substrate by applying an external force on the mesh layer.

Preferably, step S11 comprises:

forming a first photoresist layer on the rigid substrate and performing pre-curing on the first photoresist layer;

pressing the mesh layer into the pre-cured first photoresist layer, and then performing post baking to form the first photoresist layer with the mesh layer disposed therein.

Preferably, the temperature for performing the pre-curing on the first photoresist layer is 30-50° C., and the duration is 10-15 mins; the temperature for performing the post baking is 80-90° C., and the duration is not less than 20 mins.

Preferably, step S13 comprises:

forming a second photoresist layer on the side of the flexible base facing the rigid substrate, and performing pre-curing on the second photoresist layer;

making the side of the flexible base formed with the second photoresist layer fit the side of the rigid substrate formed with the supporting parts, and then performing post baking, to make the second photoresist layer adhered to the plurality of supporting parts.

Preferably, the temperature for performing the pre-curing on the second photoresist layer is 30-50° C., and the duration is 10-15 mins; the temperature for performing the post baking is 80-90° C., and the duration is not less than 30 mins.

Preferably, step S32 comprises:

heating the rigid substrate to soften the photoresist at the adhering positions of the flexible base and the supporting parts, and meanwhile pulling edges of the mesh layer, so as to separate the flexible substrate from the rigid substrate.

Preferably, the rigid substrate is made of a material that can have elastic deformation, and step S32 comprises:

forming a layer of a low-temperature contraction material layer or a high-temperature contraction material on the side of the rigid substrate facing away from the flexible substrate;

reducing the ambient temperature to make the low-temperature contraction material have contractional deformation, or increasing the ambient temperature to make the high-temperature contraction material have contractional deformation, thus stretching the mesh layer, wherein the external force is the force generated when the layer of the low-temperature contraction material or the high-temperature contraction material has the contractional deformation.

Preferably, the rigid substrate is made of a thermoplastic material, and step S32 comprises:

heating the rigid substrate to make the rigid substrate have bent deformation and meanwhile stretch the mesh layer, wherein the external force is the force generated when the rigid substrate has the bent deformation.

Preferably, the thickness of the mesh layer is smaller than the thickness of the first photoresist layer.

Preferably, the side of the rigid substrate for fixing the flexible base is disposed with first alignment marks, and the first alignment marks can match with second alignment marks on the flexible base to make the flexible base align with the rigid substrate accurately.

Preferably, a protection layer is further disposed on the first alignment marks, and the material for manufacturing the protection layer includes silicon oxides and/or silicon nitrides.

Preferably, the mesh density of the mesh layer is less than 180 meshes.

In a second aspect of the present invention, there is further provided a flexible substrate, which is manufactured by the above manufacturing method.

Preferably, the flexible substrate is a flexible touch substrate, and the functional layer comprises touch sensing electrodes.

Preferably, the flexible substrate is a flexible array substrate, and the function layer comprises pixel circuits; or the flexible substrate is a flexible color film substrate, and the functional layer comprises color filter arrays.

In a third aspect of the present invention, there is provided a display device, and the display device comprises the above flexible substrate provided by embodiments of the present invention.

The mesh connection structures of this invention lowers the cohesion force between two adjacent layers, and when an external force is applied on the mesh layer, this is equivalent to apply the force on the respective supporting parts with very small contact areas, so that the stripping difficulty is reduced, and the flexible substrate is more easy to be stripped off after it is manufactured. Moreover, the present invention does not use an UV light or a chemical liquid during the stripping off process, and does not rely on a manual stripping off method which cannot be quantified, thus avoiding the risk of damaging the flexible substrate, increasing the yield rate; moreover, the method of the present invention may be applied to manufacture large scale flexible substrates, and reduces reliance on uncertain factors like artificial factors.

Compared with the roll-to-roll process in a flexible production line, the method of the present invention manufactures a flexible substrate based on a rigid substrate, has the process compatibility with ordinary production lines and saves costs.

BRIEF DESCRIPTION OF ACCOMPANYING DRAWINGS

The accompanying drawings are provided to facilitate further understanding of the present invention and form part of the specification, and are used to illustrate the present invention together with the following description of specific implementations, but do not restrict the present invention.

FIGS. 3a-3c are a top view, a bottom view, and a side view of a rigid substrate respectively;

FIGS. 4a and 4b are a front view and a side view of a fixing process of a flexible substrate in an embodiment of the present invention;

DETAILED DESCRIPTION OF ILLUSTRATIVE EMBODIMENTS

In the following will be described the technical solutions of embodiments of the present invention in detail in conjunction with the accompanying drawings. Obviously, the described embodiments are merely for illustrating and explaining the present invention, and are not intended to limit the present invention.

Figure 1:
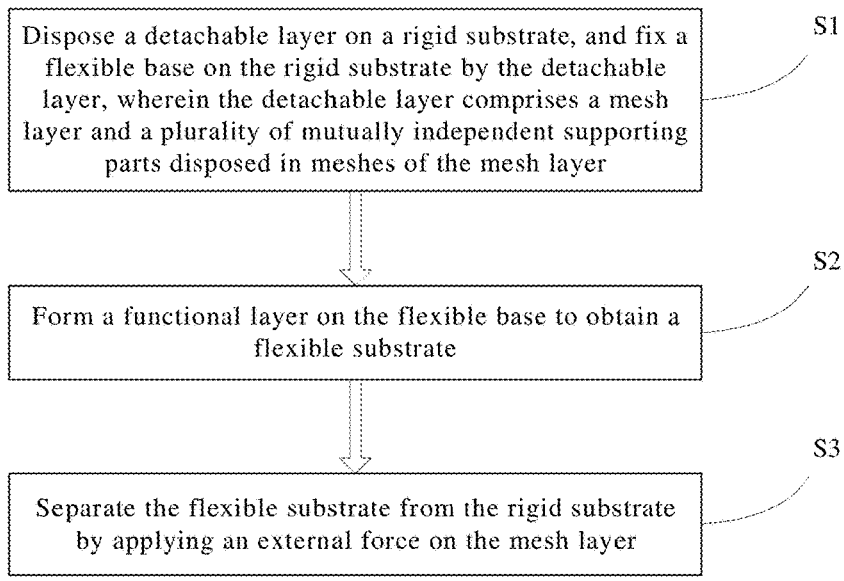
FIG. 1 is a first schematic view of a flow of a method of the present invention.

The present invention provides a manufacturing method of a flexible substrate. As shown in FIG. 1, the manufacturing method comprises the following steps:

S1: disposing a detachable layer on a rigid substrate, and fixing a flexible base on the rigid substrate by the detachable layer, wherein the detachable layer comprises a mesh layer and a plurality of mutually independent supporting parts disposed in meshes of the mesh layer;

S2: forming a functional layer on the flexible base to obtain a flexible substrate;

S3: separating the flexible substrate from the rigid substrate by applying an external force applied on the mesh layer.

It should be noted that the "functional layer" mentioned in the present invention refer to a structural layer making the flexible substrate realize functions such as displaying and touch control, e.g., a pixel circuit layer, a touch electrode layer, and a color filter layer, etc. The "flexible base" mentioned in the present invention may be a pure flexible material layer, on which the function layer is to be manufactured to obtain a "flexible substrate" with actual functions; or, the "flexible base" comprises a flexible material layer and a functional raw material layer disposed on the flexible material layer. For example, an electrode material layer has already been disposed thereon, and only by performing a patterning process, the "flexible substrate" with corresponding functions can be obtained.

The "rigid substrate" described in the present invention may be a glass substrate, a plastic substrate, etc.

The mesh connection structure of this invention lowers the cohesion force between two adjacent layers, and when an external force is applied on the mesh layer, this is equivalent to applying the force on the respective supporting parts with very small contact areas, so that the stripping difficulty is reduced, and the flexible substrate is more easy to be stripped off after it is manufactured. Moreover, the present invention does not use an UV light or chemical liquids during the stripping off process, and does not rely on a manual stripping off method which cannot be quantified, thus avoiding the risk of damaging the flexible substrate, increasing the yield rate; moreover, the method of the present invention may be applied to manufacture large scale flexible substrates, and can reduce the reliance on uncertain factors like artificial factors.

Figure 2:
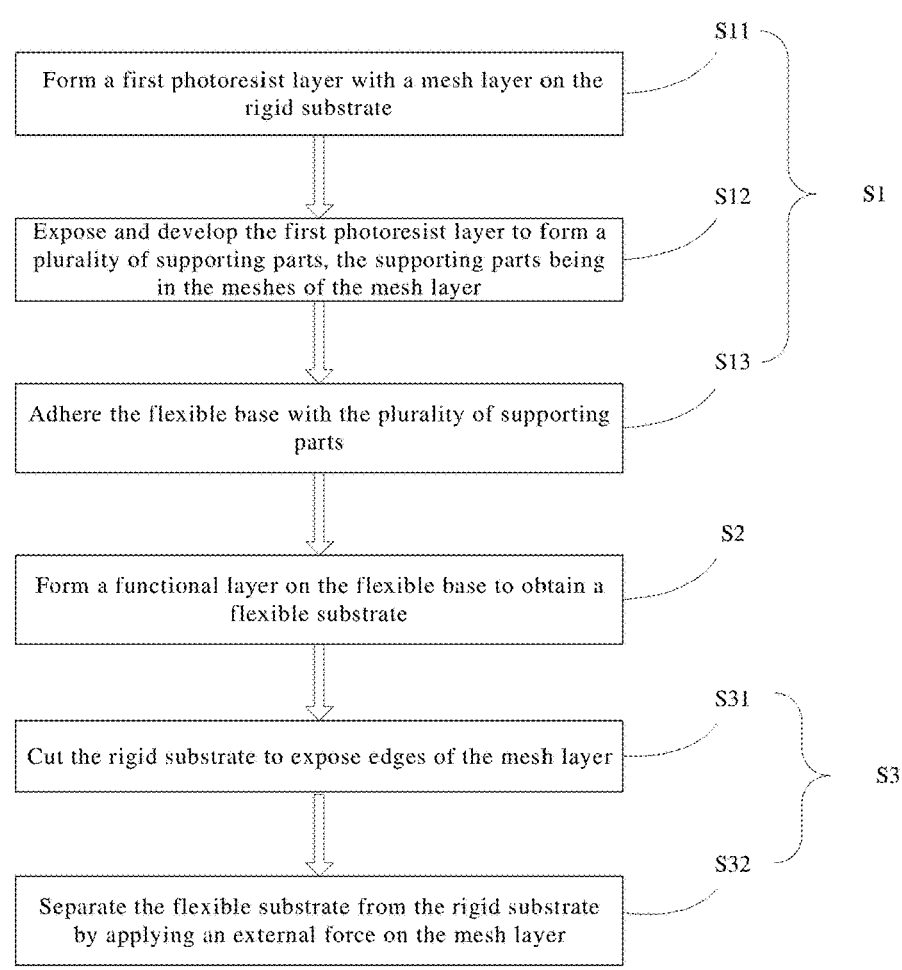
FIG. 2 is a second schematic view of a flow of a method of the present invention.

As an implementation of the present invention, as shown in FIG. 2, step S1 comprises:

S11: forming a first photoresist layer with a mesh layer on the rigid substrate;

S12: exposing and developing the first photoresist layer to form a plurality of supporting parts, the supporting parts being in the meshes of the mesh layer;

S13: adhering the flexible base and the plurality of supporting parts;

Step S3 comprises:

S31: cutting the rigid substrate to expose edges of the mesh layer;

S32: separating the flexible substrate from the rigid substrate by applying an external force on the mesh layer.

Further, step S11 specifically comprises:

forming a first photoresist layer on the rigid substrate and performing pre-curing on the first photoresist layer; and pressing the mesh layer into the pre-cured first photoresist layer, and then performing post baking to form the first photoresist layer with the mesh layer disposed therein.

During the process of performing pre-curing on the first photoresist layer, the curing temperature is maintained between 30 and 50° C., preferably 40° C. and the duration is 10-15 mins. The objective is to make the first photoresist layer just adhered on the rigid substrate, with the texture of the film layer being soft, and the solvent having not been volatized completely.

Then the mesh layer is pressed into the first photoresist layer, and at this time, post baking is performed to further cure the first photoresist layer. The temperature for performing the post baking is 80-90° C., and the duration is not less than 20 mins, so that a photoresist layer with a mesh layer disposed therein is obtained.

Preferably, the thickness of the mesh layer is smaller than the thickness of the first photoresist layer. For example, if the thickness of the first photoresist layer before the pre-curing is above 300 μm and the thickness after the pre-curing is above 200 μm, then the thickness of the mesh layer should be close to and smaller than 200 μm.

In addition, the mesh layer should have a small mesh density. Preferably, the mesh density of the mesh layer should be less than 180 meshes.

Further, step S13 specifically comprises:

forming a second photoresist layer on the side of the flexible base facing the rigid substrate, and performing pre-curing on the second photoresist layer; making the side of the flexible base formed with the second photoresist layer fit the side of the rigid substrate formed with the supporting parts and then performing post baking, to make the second photoresist layer adhered to the plurality of supporting parts.

When the pre-curing is performed on the second photoresist layer, the temperature for pre-curing is 30-50° C., preferably 40° C., and the duration is 10-15 mins. The objective of pre-curing is to make the second photoresist layer just fit the flexible base, with the film layer being soft, and the solvent having not been completely volatized.

Then the flexible base is placed on the rigid substrate, and the side of the flexible base formed with the second photoresist layer contacts the side of the rigid substrate formed with the plurality of supporting parts. In this step, the temperature for post baking is 80-90° C., and the duration is not less than 30 mins, so that the second photoresist layer is adhered with the plurality of supporting parts.

In the present invention, there are various manners of realizing "separating the flexible substrate from the rigid substrate by applying an external force on the mesh layer" in step S32.

As a first separation manner of the present invention, step S32 comprises:

heating the rigid substrate to soften the photoresist at the adhering positions of the flexible base and the supporting parts, and meanwhile pulling edges of the mesh layer, so as to separate the flexible substrate from the rigid substrate.

When heating the rigid substrate, the rigid substrate may be fixed on a heating platform. The embodiment may be applied various kinds of rigid substrates, including glass substrates, and plastic substrates.

As a second separation manner of the present invention, the rigid substrate is made of a material that can have elastic deformation, and step S32 comprises:

forming a layer of a low-temperature contraction material or a high-temperature contraction material, e.g. a rubber coating layer with low-temperature contraction, on the side of the rigid substrate facing away from the flexible substrate;

reducing the ambient temperature to make the low-temperature contraction material have contractional deformation, or increasing the ambient temperature to make the high-temperature contraction material have contractional deformation, thus stretching the mesh layer, wherein the external force is the force generated when the layer of the low-temperature contraction material or the high-temperature contraction material has contractional deformation.

As a third separation manner of the present invention, the rigid substrate is made of a thermoplastic material, e.g., a polyethylene material or PVC materials, and step S32 comprises:

heating the rigid substrate to make the rigid substrate have bent deformation and meanwhile stretch the mesh layer, wherein the external force is the force generated when the rigid substrate has the bent deformation.

The mesh connection structure of this invention lowers the cohesion force between two adjacent layers, and when external force is applied on the mesh layer, this is equivalent to a force being applied on the respective supporting parts with very small contact areas, so that the stripping difficulty is reduced. The above is merely a preferred implementation of the present invention, and the separation steps of the present invention can be adjusted based on specific process requirements, which is not described here.

Preferably, as shown in FIGS. 3a-3c, the side of the rigid substrate 1 for fixing the flexible base is disposed with first alignment marks 2, and the first alignment marks 2 can match with second alignment marks (not shown) on the flexible base substrate, so that the flexible base can align with the rigid substrate 1 accurately.

Further, a protection layer 3 is further disposed on the first alignment marks 2, and the material for making the protection layer 3 include silicon oxides and/or silicon nitrides. The protection layer 3 is for protecting the rigid substrate 1 and the first alignment marks 2 from corrosion, and for ensuring the flatness of the rigid substrate 1.

The present invention may be used to manufacture flexible touch substrates, flexible array substrates, and flexible color film substrates, etc. When the flexible substrate is a flexible touch substrate, the functional layer comprises touch sensing electrodes. When the flexible substrate is a flexible array substrate, the functional layer comprises pixel circuits; when the flexible substrate is a flexible color substrate, the functional layer comprises color filter arrays.

When a flexible display panel needs to be manufactured, the method provided by the present invention can be used to manufacture a flexible array substrate and a flexible color film substrate respectively, and before separating the flexible array substrate and the flexible color film substrate from the rigid substrate, first the two substrates may be assembled, and after they are assembled, the manufactured flexible display panel may be separated from the rigid substrates on both sides. The cell-assembling process comprises: coating an alignment layer and rubbing the alignment layer to determine an initial deflection direction of the liquid crystals; coating sealant and spacers; fitting, curing and dripping into liquid crystals, etc., which are substantially the same as those in the prior art, and are not repeated herein.

Figure 4B:
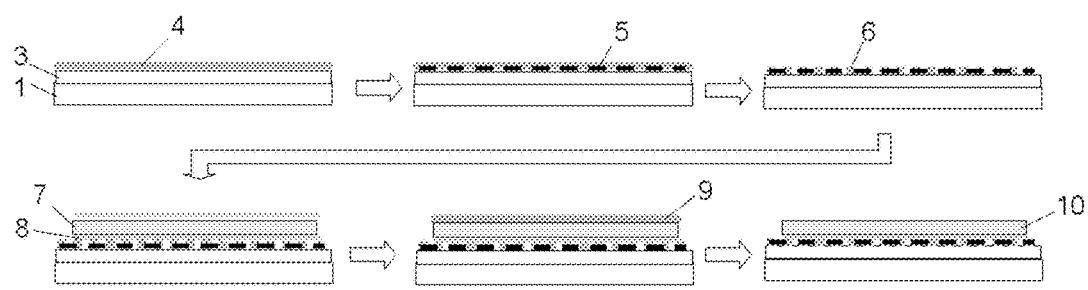
Figure 5:
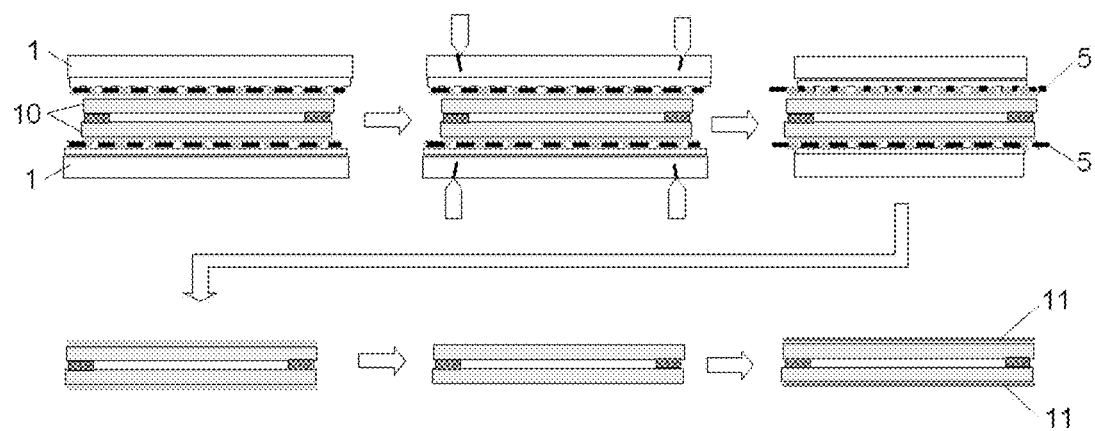
FIG. 5 is a side view of a separation process of a flexible substrate in an embodiment of the present invention.

In the following the present invention will be described in detail by a specific embodiment. FIGS. 4a and 4b are a front view and a side view of the fixing process of a flexible base in an embodiment of the present invention, and FIG. 5 is a side view of the separation process of a flexible substrate in an embodiment of the present invention.

First, the rigid substrate 1 (taking a glass substrate as an example, a protection layer 3 is disposed on the glass substrate to prevent the alignment marks on the glass substrate from corrosion) is prepared by processes such as cleaning; then a first photoresist layer 4 is roller-coated or spinning-coated on the rigid substrate 1, and the first photoresist layer 4 is pre-cured, with the pre-curing temperature being 40° C., and the duration being 10 to 15 mins. After the first photoresist layer 4 is pre-cured, it is just able to be adhered with the rigid substrate 1, and is maintained in a state in which the texture is soft, and the solvent is not completely volatized.

Then, a mesh layer 5 with etching resistance is combined with the first photoresist layer 4 by pressing, and then they are post-baked, with the temperature for the post baking being 80 to 90° C., and the duration being 20 mins. The mesh layer 5 in the present invention may be a synthetic fiber mesh layer, a gauze mesh layer, etc.

Then, the first photoresist layer 4 is exposed and developed, to form a plurality of supporting parts 6, which have a smaller size than that of the meshes of the mesh layer 5, and are located in the meshes at the corresponding positions.

In this embodiment, the flexible base 7 comprises a flexible material layer and an electrode material layer disposed on the flexible material layer. Usually, the side of the flexible base 7 with the electrode material layer disposed and the side with no electrode material layer disclosed both have a release film adhered. Here, the release film adhered on the side with no electrode material layer is torn off, and a second photoresist layer 8 is coated on this side, and then pre-curing is performed. The temperature for the pre-curing is 40° C., and the duration is 10 to 15 mins.

After the pre-curing is finished, the side of the flexible base 7 coated with the second photoresist layer 8 is closely fitted with the side of the rigid substrate 1 formed with the supporting parts 6, and then post baking is performed, with the temperature being 80 to 90° C., and the duration being 30 mins. Preferably, the cut size of the flexible base 7 is slightly smaller than the size of the rigid substrate 1.

Then, a third photoresist layer 9 is formed on the electrode material layer, and a patterning process is performed on the electrode material layer by a lithographic process to obtain the flexible substrate 10.

If the method of the present invention is used to manufacture a flexible touch substrate, finish the manufacturing of the touch electrode patterns using the above process, and the process is complete.

If the method of the present invention is used to manufacture a flexible display panel, a flexible array substrate and a flexible color film substrate need to be manufactured respectively using the same method, and then the flexible array substrate and the flexible color film substrate are cell-assembled by using the first alignment marks 2 on the rigid substrate 1, to obtain a flexible display panel.

As shown in FIG. 5, the step of separating the flexible substrate 10 from the rigid substrate 1 comprises:

After the device is manufactured, the rigid substrate 1 is cut to expose edges of the mesh layer 5. Then the flexible substrate 10 is separated by any one of the above three separation manners provided by the present invention.

For example, the rigid substrate 1 may be placed on a heat platform to be vacuum-absorbed, and the mesh layer 5 is slightly pulled to separate the flexible substrate 10 from the rigid substrate 1; after the separation, the flexible substrate 10 is cleaned to substitute a new release film 11, thus finishing the manufacturing of the flexible device.

Alternatively, a layer of a low-temperature contraction material or a high-temperature contraction material, e.g., a low-temperature contraction rubber coating layer, which will bend at low or high temperatures, may be adhered on the outer surface of the rigid substrate 1. When the cutting process is finished, the mesh layer 5 is stretched and fixed, and then the device is placed in a low-temperature environment to make it cold shrink to have bent deformation, so that the rigid substrate 1 is separated from the flexible substrate 10.

Or, the rigid substrate 1 may be manufactured by using a thermoplastic material with deformation effect. After the cutting process is finished, the flexible substrate 10 and the mesh layer 5 are stretched and fixed, and the rigid substrate 1 is heated to a certain temperature to make it contract to have bent deformation, so as to be separated from the flexible substrate 10.

The present invention makes it easier to strip off the flexible substrate after it is manufactured; it does not rely on UV light or chemical liquids, nor rely on a manual stripping method which cannot be quantified, avoiding the risk of causing damage to the flexible substrate and improving the yield rate. Moreover, the method of the present invention can be applied in manufacturing large-scale flexible substrates, and reduce the reliance on uncertain factors like human ones.

The present invention further provides a flexible substrate, which is manufactured using the above manufacturing method. The flexible substrate manufactured by the method of the present invention effectively reduces the difficulty of stripping off the flexible substrate from the rigid substrate, avoids the risk of damaging the flexible substrate, and improves the yield rate.

In order to realize a different function, the flexible substrate in the present invention may comprise a flexible base and a different functional layer disposed on the flexible base. For example, the flexible substrate may be a flexible touch substrate, in which case, the corresponding functional layer comprises touch sensing electrodes; or the flexible substrate may be a flexible array substrate, in which case, the corresponding functional layer comprises pixel circuits; or the flexible substrate may be a flexible color film substrate, in which case, the corresponding functional layer comprises color filter arrays, and so on.

The present invention further provides a display device, which comprises the above flexible substrate provided by the present invention. As described above, the display device has the advantage of high yield rate.

It can be understood that the embodiments described above are merely exemplary embodiments of the present invention, and the present invention is not limited thereto. For those skilled in the art, many changes or improvements may be made without departing from the spirit and essence of the present invention. Those changes and improvements are also considered to be within the protection scope of the present invention.

The invention claimed is:

1. A method of manufacturing a flexible substrate, the method comprising:
   disposing a detachable layer on a rigid substrate and fixing a flexible base on the rigid substrate by the detachable layer, wherein the detachable layer comprises a mesh layer and a plurality of mutually independent supporting parts disposed in meshes of the mesh layer;
   forming a functional layer on the flexible base to obtain a flexible substrate; and
   separating the flexible substrate from the rigid substrate by applying an external force on the mesh layer, wherein separating the flexible substrate from the rigid substrate by applying the external force comprises one of the following steps (a)-(c):
   (a) heating the rigid substrate to soften the supporting parts and meanwhile pulling edges of the mesh layer;
   (b) forming a layer of a low-temperature contraction material or a high-temperature contraction material on the side of the rigid substrate facing away from the flexible substrate, and reducing the ambient temperature to make the low-temperature contraction material have contractional deformation, or increasing the ambient temperature to make the high-temperature contraction material have contractional deformation, thus stretching the mesh layer, wherein the external force is the force generated when the layer of the low-temperature contraction material or the high-temperature contraction material has contractional deformation, and wherein the rigid substrate is made of a material that can have elastic deformation; and (c) heating the rigid substrate to make the rigid substrate have a bent deformation and meanwhile stretching the mesh layer, wherein the external force is the force generated when the rigid substrate has the bent deformation, and wherein the rigid substrate is made of a thermoplastic material.

2. The manufacturing method of claim 1, wherein disposing the detachable layer on the rigid substrate and fixing the flexible base on the rigid substrate by the detachable layer comprises:
    forming a first photoresist layer with the mesh layer on the rigid substrate;
    exposing and developing the first photoresist layer to form the plurality of supporting parts; and
    adhering the flexible base and the plurality of supporting parts; and
    wherein separating the flexible substrate from the rigid substrate by applying an external force on the mesh layer comprises cutting the rigid substrate to expose the edges of the mesh layer.

3. The manufacturing method of claim 2, wherein forming the first photoresist layer on the rigid substrate comprises:
    performing pre-curing on the first photoresist layer; and
    pressing the mesh layer into the pre-cured first photoresist layer, and then performing post baking to form the first photoresist layer with the mesh layer disposed therein.

4. The manufacturing method of claim 3, wherein the temperature for performing the pre-curing on the first photoresist layer is 30-50° C., and the duration is 10-15mins, and wherein the temperature for performing the post baking is 80-90° C., and the duration is not less than 20mins.

5. The manufacturing method of claim 2, wherein adhering the flexible base and the plurality of supporting parts comprises:
    forming a second photoresist layer on the side of the flexible base facing the rigid substrate, and performing pre-curing on the second photoresist layer; and
    making the side of the flexible base formed with the second photoresist layer fit the side of the rigid substrate formed with the supporting parts, and then performing post baking to adhere the second photoresist layer to the plurality of supporting parts.

6. The manufacturing method of claim 5, wherein the temperature for performing the pre-curing on the second photoresist layer is 30-50° C., and the duration is 10-15 mins, and wherein the temperature for performing post baking is 80-90° C., and the duration is not less than 30 mins.

7. The manufacturing method of claim 2, wherein the thickness of the mesh layer is smaller than the thickness of the first photoresist layer.

8. The manufacturing method of claim 1, further comprising disposing first alignment marks on the side of the rigid substrate for fixing the flexible base, the first alignment marks matching second alignment marks on the flexible base to make the flexible base align with the rigid substrate accurately.

9. The manufacturing method of claim 8, further comprising disposing a protection layer on the first alignment marks, the protection layer including silicon oxides and/or silicon nitrides.

10. The manufacturing method of claim 1, wherein a mesh density of the mesh layer is less than 180 meshes.

* * * * *